United States Patent [19]
Achenbach et al.

[11] 3,883,789
[45] May 13, 1975

[54] POWER PACK

[75] Inventors: Dieter Achenbach, Betzdorf, Sieg; Siegfried Adolf Joswig, Kausen b.Betzdorf; Walter Kolb, Betzdorf, Sieg, all of Germany

[73] Assignee: Wolf-Gerate GmbH, Betzdorf, Germany

[22] Filed: Mar. 19, 1974

[21] Appl. No.: 452,634

[30] Foreign Application Priority Data
June 8, 1973 Germany.............................. 2329415

[52] U.S. Cl. .............. 320/2; 15/DIG. 1; 30/DIG. 1; 310/50
[51] Int. Cl. ......................................... H01m 45/00
[58] Field of Search ................................. 320/2–5; 310/50; 30/DIG. 1; 15/DIG. 1; 16/DIG. 15; 307/150

[56] References Cited
UNITED STATES PATENTS

| | | | |
|---|---|---|---|
| 3,533,119 | 10/1970 | Dokos................. | 320/2 X |
| 3,623,223 | 11/1971 | Edgell et al. ............ | 30/DIG. 1 UX |
| 3,757,194 | 9/1973 | Weber et al. ............. | 320/2 |
| 3,759,020 | 9/1973 | Simmons................ | 30/DIG. 1 X |

*Primary Examiner*—J. D. Miller
*Assistant Examiner*—Robert J. Hickey
*Attorney, Agent, or Firm*—Ostrolenk, Faber, Gerb & Soffen

[57] ABSTRACT

The specification describes a power pack for house and garden equipment with an electric motor drive. Rechargeable batteries including a battery charger and a battery charger plug are mounted in a housing, which with a guide holding collar having two electrical contact terminals can be slid into a correspondingly shaped recess with a close fit in the housing of an article of equipment and can be locked in place.

4 Claims, 8 Drawing Figures

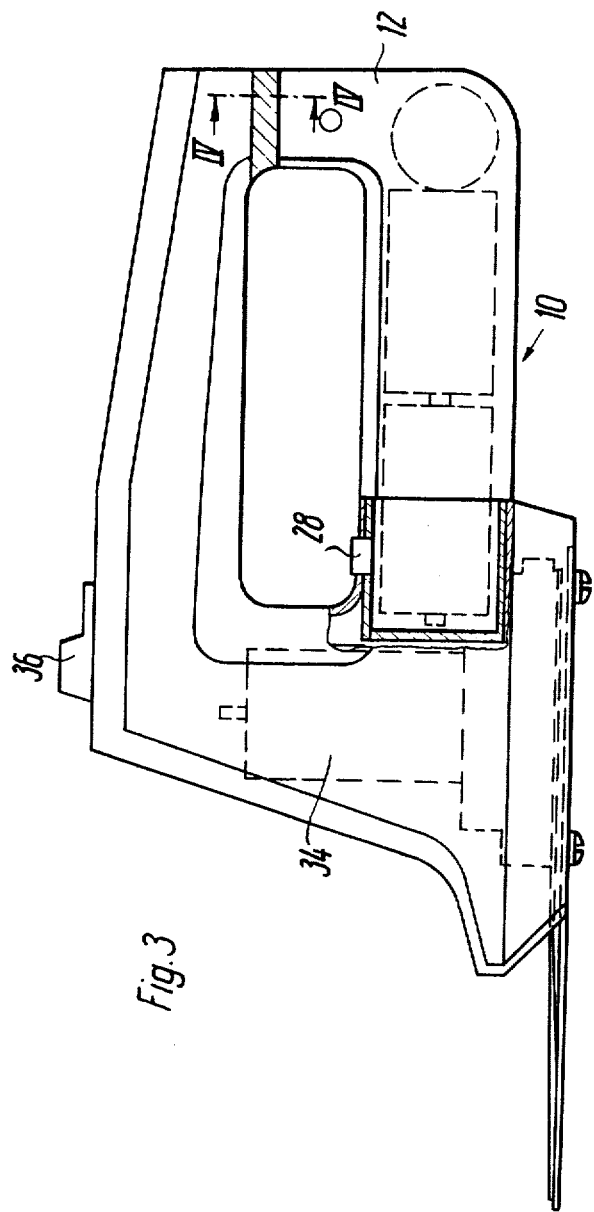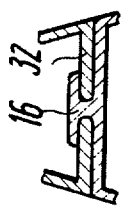

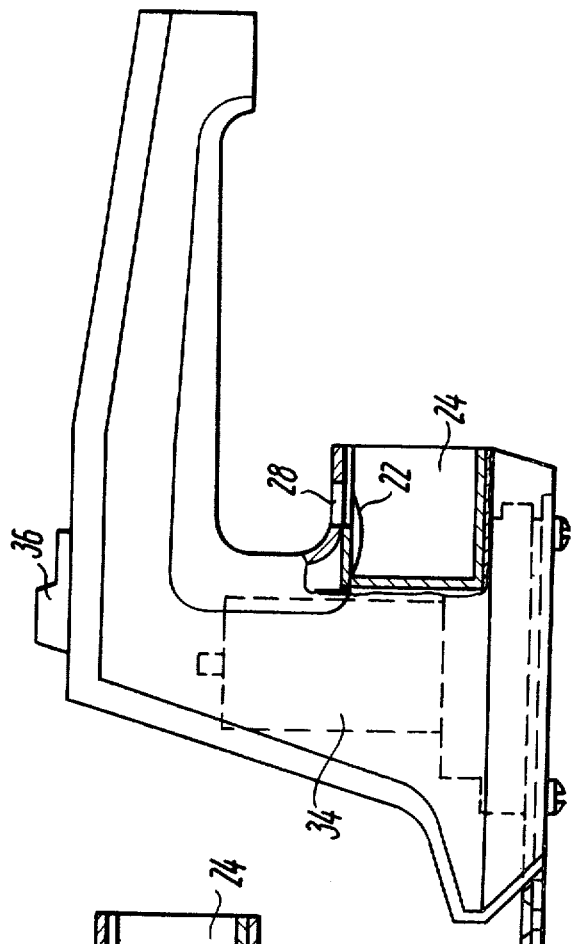
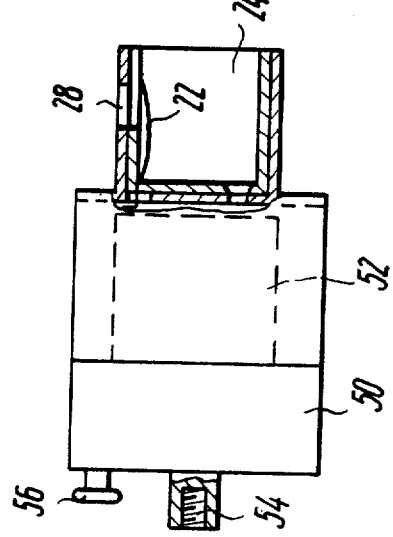

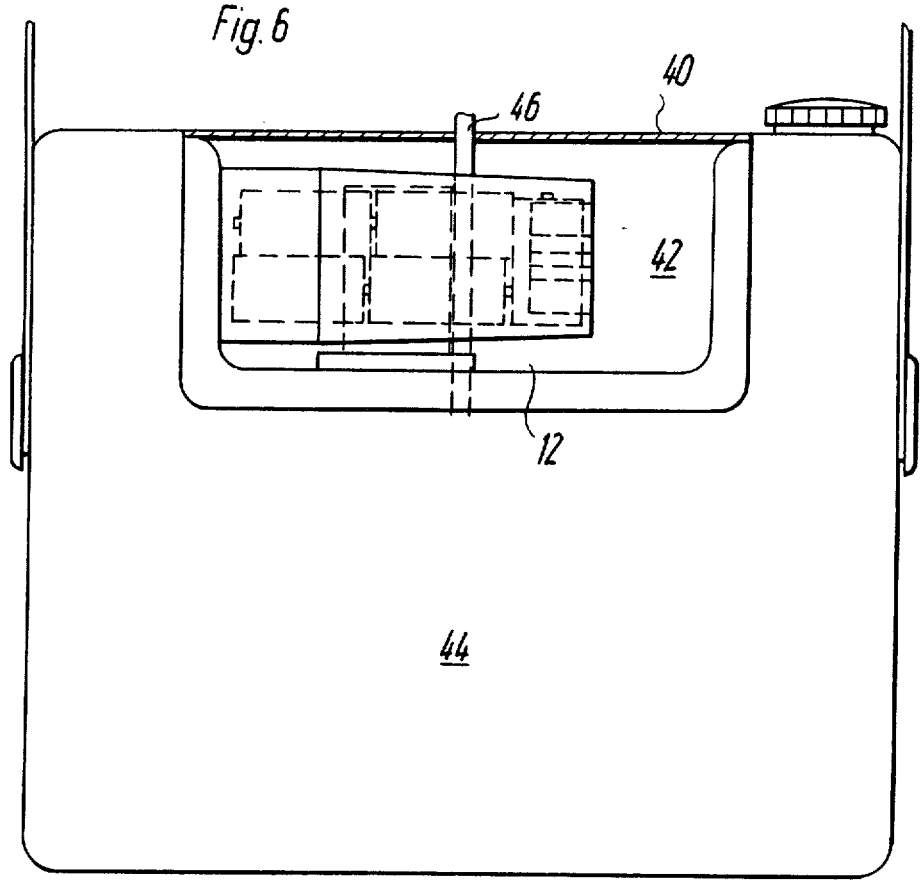
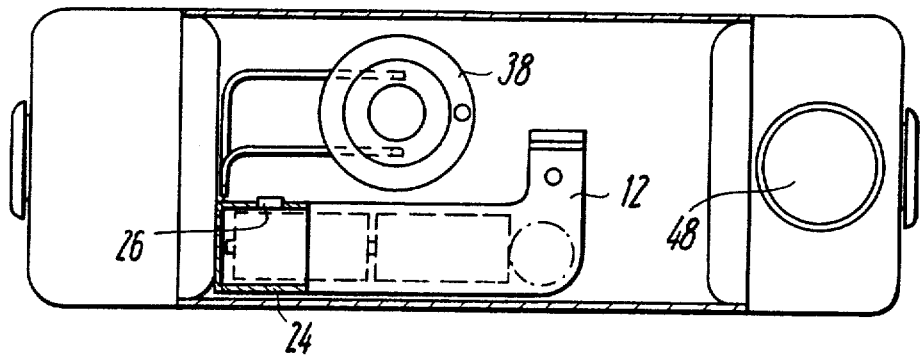

POWER PACK

BACKGROUND OF INVENTION

1. Field to which invention relates

The invention relates to a power pack for house and garden equipment with an electric motor drive.

2. The prior art

The development of novel efficient and accordingly lighter batteries on a nickel-cadmium basis has made it possible to incorporate battery-driven motors in electrically driven house and garden equipment instead of mains-supplied electric motors. This not only takes into account the safety requirement, but also there is the advantage of substantially easier handling owing to dispensing with supply leads. These novel batteries have furthermore made it possible to drive tools by motors, which formally were not suitable for incorporation of a mains-supplied motor and therefore were exclusively provided with a hand drive, as is the case for example with grass shears.

One disadvantage of these novel rechargeable nickel-cadmium batteries lies in their price, which makes up a substantial percentage of the overall costs of such an article of equipment.

SUMMARY OF INVENTION

One aim of the present invention is to create a power pack provided with such batteries, which can be fitted selectively in different articles of equipment and makes the article ready for use. The invention is based on the consideration that although a house or garden owner may not simultaneously buy the various types of equipment which save labour but may purchase such equipment one after the other in succession, a substantial saving in costs is obtained if on further purchases he does not have to pay for the batteries, because the power pack required has already been acquired with the first article of equipment purchased and can then be used for all further forms of equipment. A single such power pack or current supply is also quite sufficient for most applications, because, as experience has shown in one household several such devices are not used simultaneously or at least there is no urgent need to use them simultaneously.

The present invention relates to a power pack for house and garden equipment with an electric motor drive, characterised in that rechargeable batteries including a battery charger and a battery charger plug are mounted in a housing, which with a guide holding collar having two electrical contact terminals can be slid into a correspondingly shaped recess with a close fit in the housing of an article of equipment and can be locked in place.

In this manner it is possible to achieve an extremely economical use of the batteries, because even in the case of these batteries a certain degree of ageing is unavoidable so that in the case of the use of the system in accordance with the invention a new battery must be purchased in the form of a power pack, in the case of which otherwise all batteries individually provided for the single articles of equipment must be replaced.

A further substantial advantage of the invention resides in that the charging up of the power pack can take place within the equipment. Accordingly this avoids injury, on the one hand, which might occur owing to improper switching on of the equipment during the charging operation, and, on the other hand, if in the garden shed or the like no mains or line connection is available, the relevant article of equipment which has become dirty in use does not need to be taken into the house for recharging.

As is apparent the system in accordance with the invention does not constitute a simple application of measures found in the case of non-rechargeable dry batteries to new chargeable batteries, for the system in accordance with the invention does not reside in providing in the equipment insertion spaces for special novel batteries, but is characterised in that a power pack is disclosed which provides the batteries, necessary for discharge and recharge, for example five batteries, in a housing, which as a whole can be inserted in several articles of equipment and simultaneously an electric contact connection is ensured.

In accordance with a preferred embodiment of the invention the battery housing consisting more particularly of plastics material is so shaped that is forms part of the housing of equipment and with the latter constitutes a functional unit.

Thus, in accordance with a preferred embodiment of the invention the housing is constructed as part of a handle, which is completed by the housing part of the equipment, for example a garden shears or a hedge shears. For this purpose the housing is made approximately L-shaped and at the end of the long limb has the insert guide sleeve, while the end of the shorter limb is provided with a dovetailed locking device, which brings about an interlocking connection with the rest of the handle housing.

LIST OF SEVERAL VIEWS OF DRAWINGS

In what follows embodiments of the invention will be described with reference to the accompanying drawings.

FIG. 3 is a side view of a grass shears with the power pack in accordance with FIGS. 1 and 2 in the inserted condition.

FIG. 4 is a part view from FIG. 3 on the line IV—IV on a larger scale.

FIG. 5 is a partly broken away view of a hedge shears with the power pack or current supply removed.

FIG. 6 is a side view of a spraying device with the battery inserted.

FIG. 7 is a plan view of the device in accordance with FIG. 6.

FIG. 8 is a partly broken open side view of a barbecue or grill motor with the power pack removed.

DESCRIPTION OF PREFERRED EMBODIMENTS

Figure 1:
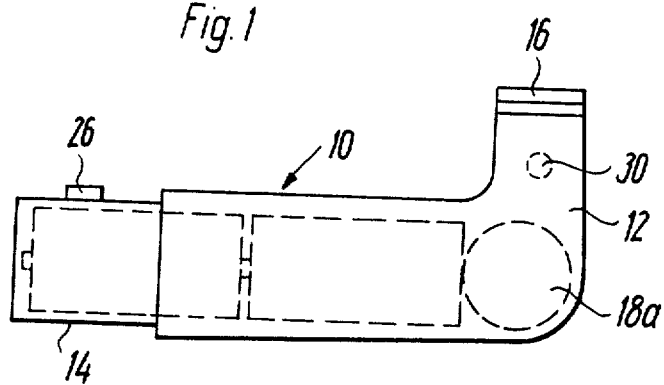
FIG. 1 shows a diagrammatic side view of the power pack or current supply constructed in accordance with the invention.
Figure 2:
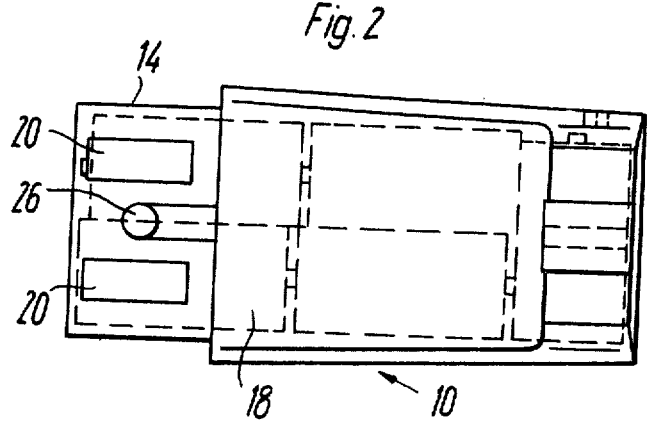
FIG. 2 is a plan view of the power pack in accordance with FIG. 1.

The power pack 10 or current supply consists of an L-shaped housing 12 made of plastics material with a front guide collar 14 and a dovetail guide 16 at the end of the short limb. The housing accommodates five batteries 18 connected in series, the batteries preferably being of the nickel-cadmium type. Of these batteries two batteries are arranged with parallel axes alongside each other and in tandem, while the fifth battery 18a being arranged transverse to the two parallel pairs of batteries. The series connections are not indicated in the drawing. The series connection can be brought about by soldering or by suitable spring contacts. On the guide and holding collar 14 two contact springs 20 are arranged projecting to the outside, which make contact with corresponding contact springs 22 (see FIG. 5) of a recess 24 with a close fit in the housing of the device.

The battery housing 12 furthermore has a spring mounted axially sliding locking knob 26, which snaps into a locking recess 28 of the housing of the equipment. Reference numeral 30 denotes a charger plug connection.

As can be seen from FIG. 4, the dovetail construction 16 of the housing constitutes a I-shape means for positive or interlocking fixation between two connecting pieces 32 of the housing of the equipment. In the case of the embodiment in accordance with FIGS. 3 and 5 the battery housing 12, which in FIG. 5 is not inserted, forms part of the holding handle and simultaneously a means for stiffening the housing of the equipment. In FIGS. 3 and 5 the motor 34 and the switching-on knob 36 and also the currect supply from the connecting springs 22 are only shown diagrammatically.

The embodiment of the invention in accordance with FIGS. 6 and 7 is a spraying device with an electric motor-driven pump 38. The battery housing 12 in accordance with the invention is in this case inserted under a cover or shroud 40 in a recess 42 of the container 44 for the material to be sprayed. The spraying tube 46 extends from the shroud. Reference numeral 48 denotes the filling tube.

FIG. 8 shows a barbecue 50 with a motor 52 and a receiving bush 24 with a close fit for insertion and locking of the battery housing, which in this case can serve as a carrying handle for the barbecue. The motor 52 drives the barbecue spit connection 54 via a step-down drive. A counterbearing 56 prevents the relatively light motor unit from being driven by the article to be barbecued.

What we claim is:

1. A power pack for use with a hand tool comprising a housing, an electric motor positioned within the forward end of said housing; a reciprocating tool assembly extending from the forward end of said housing and being coupled for operation to said motor; an integral handle portion extending rearwardly from the rear upper portion of said housing; the rear-most free end of said handle having a downwardly facing groove defined by a pair of spaced surfaces;

the lower rear portion of said tool housing having a hollow rearwardly facing collar;

first electrical contact means along one interior surface of said collar; one wall of said collar having an opening;

said power pack comprising:

an L-shaped housing;

a plurality of batteries in said L-shaped housing;

means in said L-shaped housing for electrically connecting said batteries;

one limb of said L-shaped housing having a configuration conforming to the shape of the hollow limb receiving collar provided at the lower rear end of said tool housing;

said one limb being adapted to be slidably inserted into said hollow collar;

second electrical contact means along one exterior portion of said one limb and means for connecting said second contact means to said batteries; said second contact means slidably engaging said first contact means when said one limb is inserted into said collar;

the remaining limb of said L-shaped housing having a T-shaped projection for slidably engaging the facing edges of said spaced surfaces when said one limb is inserted into said hollow collar;

said one limb having a locking projection, biasing means for urging said locking projection outwardly and into said collar opening to lock said L-shaped housing in said collar when said one limb is inserted into said hollow collar;

said tool housing handle and said L-shaped housing collectively defining a large opening for receiving the operator's hand to facilitate gripping of the tool.

2. The tool of claim 1 wherein the opening in said limb receiving collar and said locking projection face into said hand receiving opening.

3. A power pack in accordance with claim 1, characterised in that five batteries are accommodated in the L-shaped housing, of which respectively two pairs are arranged with parallel axes alongside each other and in a tandem fashion, while the remaining battery lies perpendicular to said two pairs of batteries.

4. A power pack in accordance with claim 1, characterised in that the first contact means of said holding collar comprises contact connecting lugs, which cooperate with said second contact means comprised of contact connection springs arranged within a recess with a close fit of the housing.

* * * * *